H. G. MORRIS.
BEARING FOR CENTRIFUGAL MACHINES.
APPLICATION FILED AUG. 6, 1909.
1,005,776.
Patented Oct. 10, 1911.
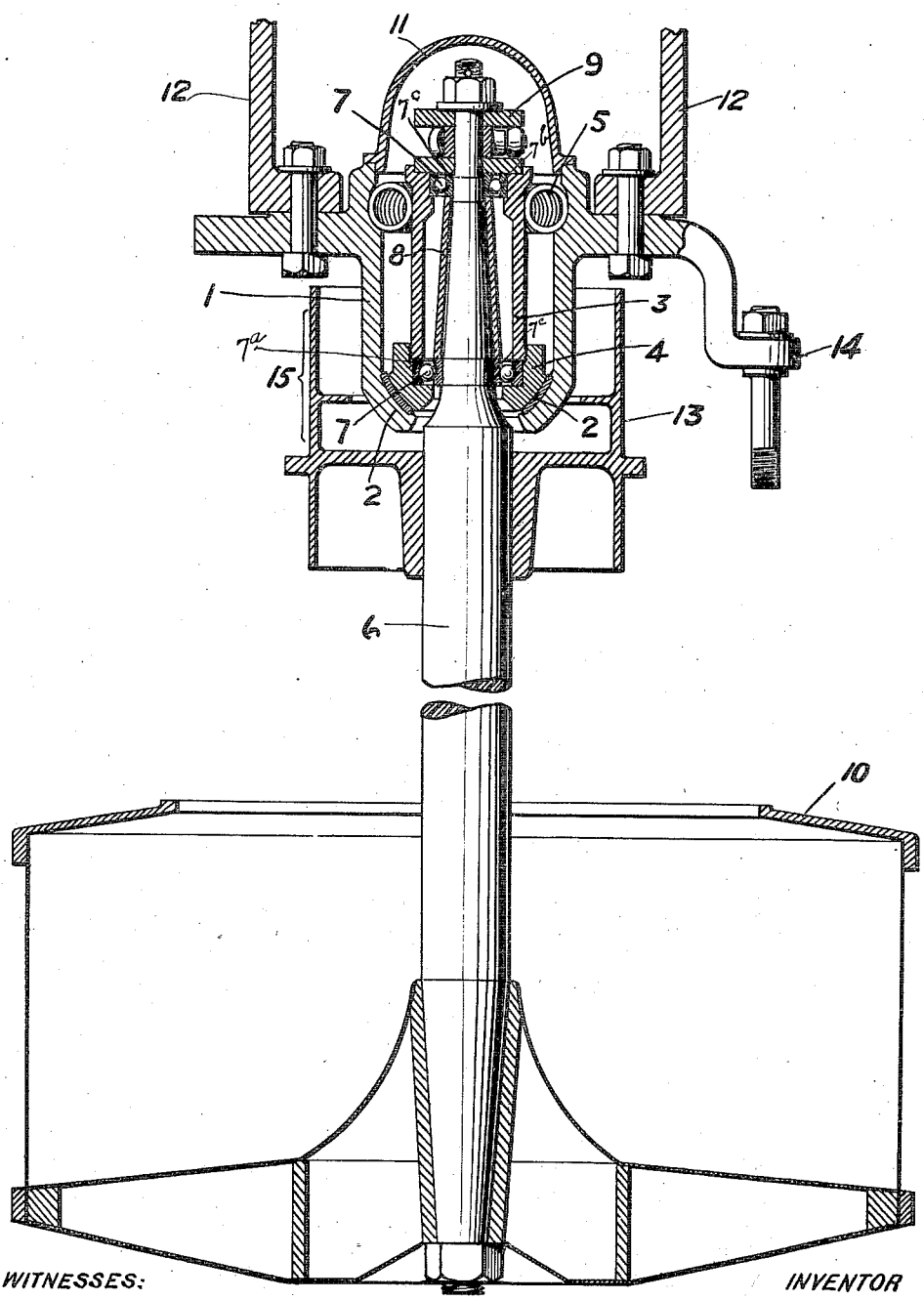
WITNESSES:
INVENTOR
Henry G. Morris.
BY
Augustus B. Stoughton
ATTORNEY.

UNITED STATES PATENT OFFICE.

HENRY G. MORRIS, OF PHILADELPHIA, PENNSYLVANIA, ASSIGNOR TO MORRIS ENGINEERING COMPANY, OF PHILADELPHIA, PENNSYLVANIA, A CORPORATION OF PENNSYLVANIA.

BEARING FOR CENTRIFUGAL MACHINES.

1,005,776.      Specification of Letters Patent.      Patented Oct. 10, 1911.

Application filed August 6, 1909. Serial No. 511,591.

*To all whom it may concern:*

Be it known that I, HENRY G. MORRIS, a citizen of the United States, residing at the city of Philadelphia, in the county of Philadelphia and State of Pennsylvania, have invented certain new and useful Improvements in Bearings for Centrifugal Machines, of which the following is a specification.

One object of the present invention is to provide such a construction and arrangement of parts that antifriction bearings, meaning ball or roller bearings inclusively, can be employed for carrying the basket spindle.

Another object of the invention is to provide an efficient and durable support for the quill in which the spindle is revolubly mounted; and another object of the invention is to provide a compact, durable, efficient and light running bearing or support for the basket spindle.

The accompanying drawings illustrate principally in central section parts of a centrifugal machine embodying features of the invention.

In the drawings 1, is a tubular hanger having near one end an element 2, of a cup-and-ball or spherical bearing.

3, is a quill or sleeve arranged in the hanger and having near one end the other element 4, of the cup-and-ball or spherical bearing.

5, is a cushion guide interposed between the hanger and quill so that the quill may assume various positions while supported by the cup-and-ball or spherical bearing.

6, is a spindle arranged through the quill and there are radial and end thrust anti-friction bearings interposed between the spindle and quill. The term anti-friction bearings is inclusive of both ball and roller bearings.

7, are annular ball bearings which take radial thrust. The outer ring of each annular bearing is fitted to the sleeve or quill. In the case of the lower bearing the outer ring 7ª is held between the two parts of the quill which parts are screwed together. In the case of the upper bearing the outer ring 7ᵇ is held in a socket formed in the upper section of the quill or sleeve. The inner rings 7ᶜ of each bearing are fitted to the spindle and they are spaced apart by a distance sleeve 8. One of the hard collars of the end thrust bearing is fitted to a seat on the top of the quill. The other collar 9, of the end thrust bearing is held to place on the spindle by a nut. The rollers or ball sections run between these washers and may be three in number and may be mounted to run on spuds projecting from a hub rotatable on the spindle.

10, is a basket which is carried by the spindle.

11, is a cap or cover.

12, are supports.

13, is a pulley for driving and braking the spindle, and 14, is a fitting that is often provided for supporting the brake. It may be stated that the center of the spherical bearing should lie in line with the center of the surface 15, of the pulley which is occupied by the driving belt. The cushion guide 5, is shown to consist of a coiled spring but it may consist of a gum cushion. In the drawings one of the elements of the spherical bearing is shown as faced with Babbitt or other suitable metal.

When the basket is rotated it revolves in the quill on the described radial and thrust bearings. If the basket be unevenly loaded the spindle and quill adjust themselves in the hanger by reason of the spherical bearing and cushion guide and the former affords adequate and durable support for the moving parts.

What I claim is:

In a centrifugal machine the combination of a tubular hanger having an element of a bearing having the form of a part of a sphere, a two-part quill or sleeve arranged in the hanger and having the other element of said bearing and also a seat, a cushion guide interposed between the tubular portion of the hanger and the quill, a spindle arranged through the quill, an end-thrust anti-friction bearing for the spindle, and a pair of annular ball bearings whereof one has its outer ring held between the two parts of the quill and whereof the other has its inner ring in abutment with said seat.

HENRY G. MORRIS.

Witnesses:
    K. M. GILLIGAN,
    SUSAN E. PATTERSON.